(12) United States Patent
Friesen et al.

(10) Patent No.: US 8,403,611 B2
(45) Date of Patent: Mar. 26, 2013

(54) SINGLE PIECE NUT ASSEMBLY

(75) Inventors: Bruce Friesen, Longview, TX (US); Daniel Trejo Jimenez, Longview, TX (US)

(73) Assignee: Stemco LP, Longview, TX (US)

( * ) Notice: Subject to any disclaimer, the term of this patent is extended or adjusted under 35 U.S.C. 154(b) by 480 days.

(21) Appl. No.: 12/847,959

(22) Filed: Jul. 30, 2010

(65) Prior Publication Data

US 2011/0027041 A1 Feb. 3, 2011

Related U.S. Application Data

(60) Provisional application No. 61/230,688, filed on Jul. 31, 2009.

(51) Int. Cl.
*F16B 39/00* (2006.01)
*F16B 39/10* (2006.01)
*F16B 39/12* (2006.01)
*F16B 39/14* (2006.01)

(52) U.S. Cl. ........ 411/197; 411/191; 411/198; 411/204; 411/533; 411/544

(58) Field of Classification Search ............... 411/190, 411/191, 197, 198, 202–204, 259, 260, 292, 411/293, 313, 314, 326, 328, 533, 544
See application file for complete search history.

(56) References Cited

U.S. PATENT DOCUMENTS

| | | | | |
|---|---|---|---|---|
| 687,774 | A * | 12/1901 | Oliver | 411/326 |
| 763,950 | A * | 7/1904 | Beckett | 411/328 |
| 1,077,670 | A * | 11/1913 | Church | 411/221 |
| 3,581,609 | A * | 6/1971 | Greenwood | 81/124.7 |
| 3,942,570 | A * | 3/1976 | Bochman et al. | 411/220 |
| 4,534,101 | A * | 8/1985 | Rosan, Jr. | 29/432 |
| 4,812,094 | A * | 3/1989 | Grube | 411/134 |
| 5,180,265 | A * | 1/1993 | Wiese | 411/150 |
| 5,533,794 | A * | 7/1996 | Faison | 301/105.1 |
| 5,533,849 | A * | 7/1996 | Burdick | 411/120 |
| 5,597,278 | A * | 1/1997 | Peterkort | 411/134 |
| 5,618,143 | A * | 4/1997 | Cronin et al. | 411/220 |
| 5,618,145 | A * | 4/1997 | Kuo | 411/432 |
| 5,674,034 | A * | 10/1997 | Bennett | 411/197 |
| 6,290,442 | B1 * | 9/2001 | Peterkort | 411/140 |
| 6,554,555 | B2 * | 4/2003 | Imahigashi | 411/533 |
| 6,749,386 | B2 * | 6/2004 | Harris | 411/544 |
| 7,029,218 | B2 * | 4/2006 | Peterkort | 411/198 |
| 7,226,259 | B2 * | 6/2007 | Harris | 411/150 |
| 7,811,038 | B2 * | 10/2010 | Jimenez | 411/328 |
| 8,011,866 | B2 * | 9/2011 | Harris | 411/150 |
| 8,292,373 | B2 * | 10/2012 | Rieger et al. | 301/111.03 |
| 2002/0136617 | A1 * | 9/2002 | Imahigashi | 411/533 |
| 2004/0213646 | A1 * | 10/2004 | Jakuszeski et al. | 411/544 |
| 2011/0027041 | A1 * | 2/2011 | Friesen et al. | 411/313 |
| 2011/0194911 | A1 * | 8/2011 | Leroyer | 411/190 |

* cited by examiner

*Primary Examiner* — Victor Batson
*Assistant Examiner* — Tyler Johnson
(74) *Attorney, Agent, or Firm* — Holland & Hart LLP

(57) ABSTRACT

Self-locking nuts help prevent the nut from backing off of a spindle or other type of threaded shaft. A single piece nut assembly is provided that is self-locking and comprises a nut subassembly and a washer subassembly. Nut and washer subassemblies are secured together, and do not require any special tools for installation or removal. The washer has an edge which is formed/rolled over a lip extending from the bottom edge of the nut when assembled to provide the unitized assembly. The nut and washer are held apart by a spring, such as a wave spring, until the washer contacts the face of the object to which the nut is being secured. At this point the spring is compressed to engage the nut with the washer, and engage holding elements located in the nut with a holding feature located on the washer and prevent movement between the washer and nut.

11 Claims, 7 Drawing Sheets

SINGLE PIECE NUT ASSEMBLY

CROSS REFERENCE TO RELATED APPLICATIONS

This application claims priority to U.S. Provisional Patent Application No. 61/230,688, filed on Jul. 31, 2009, the entire disclosure of which is incorporated herein by reference.

FIELD

Embodiments described herein generally relate to fastening mechanisms. Embodiments of the present invention more specifically relate to self-locking fastening mechanisms.

BACKGROUND

Nuts are well known implements generally used to hold an object in place and may be used in numerous different application such as, for example, the ends of axles or spindles. For example, a nut may be used to hold the wheel-end of a truck in place by engaging with a spindle. A nut is generally a metal part with a circular, threaded bore through the middle, usually for engaging with a threaded spindle or similar implement. The nut is screwed onto the spindle and tightened against the object to be held in place. However, a problem with conventional nuts is that they may be prone to loosening during use, a failure known as "backing off." For example, if a nut securing a truck's wheel-end backs off, the wheel-end may become loose or break apart from the vehicle. Such an incident poses a significant safety concern.

To remedy this problem, there are nuts may be assembled with multiple components that are assembled as the nut is put into place that cause the nut to lock into place, reducing the likelihood of the nut backing off.

SUMMARY

Embodiments of the present invention provide self-locking nuts that help prevent the nut from backing off of a spindle or other type of threaded shaft. For example, according to one embodiment, a single piece axle spindle nut assembly is provided that is self-locking and comprises a nut subassembly and a washer subassembly. The assembly of this embodiment is provided as a single piece, with the nut and washer subassemblies secured together, and does not require any special tools for installation or removal. The washer has an edge which is formed/rolled over a lip extending from the bottom edge of the nut when assembled to provide the unitized assembly. The nut and washer are held apart by a spring, such as a wave spring, until the washer contacts the face of the object to which the nut is being secured. At this point the spring is compressed to engage the nut with the washer.

The washer also has holding features that are engaged when the spring is compressed. The holding features, in an embodiment, are spring loaded plungers inserted into the nut body and prevent rotation of the nut during service. The quantity of holding features depends on the retention force required per application. These holding features do not engage until the washer contacts the face of the object to which the nut is being secured. This allows the nut to be installed without resistance until the nut contacts the face of the object to which the nut is being secured. In an embodiment, the washer is hardened and features a wide tang area which mates with a keyway in a spindle. Such a wide tang allows for a large area to transfer any torque and would reduce spindle damage. The hardened washer would absorb all rotational forces. The nut would prevent axial movement and stop the assembly from unscrewing and maintain the bearing adjustment over time. The nut assembly may be installed using standard installation tools, and does not require any special tool for installation or removal. Furthermore, the tool, such as a standard socket, used for installation or removal is not required to engage any portion of locking or holding features in order to install or remove the nut assembly.

The holding features act to retain the nut by themselves over time, but in one embodiment an additional locking feature is also incorporated into the assembly. The locking feature of this embodiment operates on a cam type system which locks the feature in a released or engaged state, and is operated by hand. The locking feature has to be disengaged in order for a socket to be installed on the nut for installation or removal. Once the nut is properly installed the locking feature of this embodiment is rotated out by hand and does not require any special tools. The locking feature locks the nut to the washer and provides additional safety over the holding features. The design of the engaging holes or slots for the locking pin depends on how much rotation is desired once locked. The nut can be used in both an end-play or pre-load installation.

One aspect of the present disclosure, in particular, provides a single piece locking nut assembly, comprising: (A) a nut having (i) a top surface, (ii) a bottom surface, (iii) a substantially cylindrical opening through the center thereof, at least a portion of which having threads that are adapted to engage with corresponding threads of a spindle, and (iv) one or more cavities that each receive a holding element that extends into the cylindrical opening; (B) a washer comprising (i) a substantially cylindrical opening through the center thereof, (ii) a washer base, (iii) an inner wall extending up from the washer base extending around at least a portion of the cylindrical opening and extending into the cylindrical opening of the nut, and (iv) a locking feature located on a side of the inner wall that is opposite the washer opening, the locking feature comprising a plurality of ridges that engage one or more holding elements; and (C) a biasing member located between the nut bottom surface and the washer base that prevents the holding element(s) from engaging the locking feature when the nut assembly is not fully engaged with a spindle.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
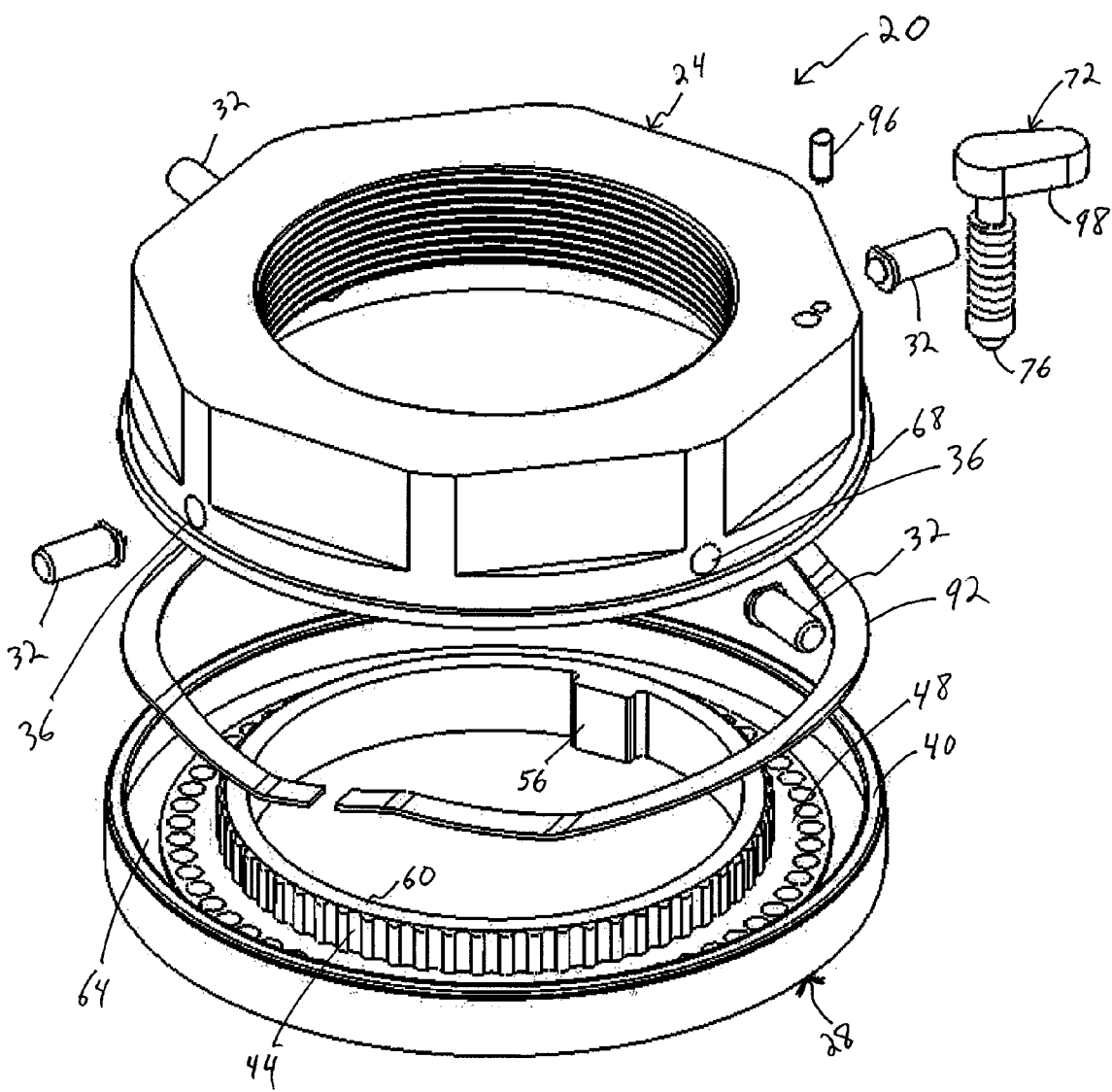
FIG. 1 is a top perspective of an exploded view of a self-locking nut according to an embodiment.
Figure 2:
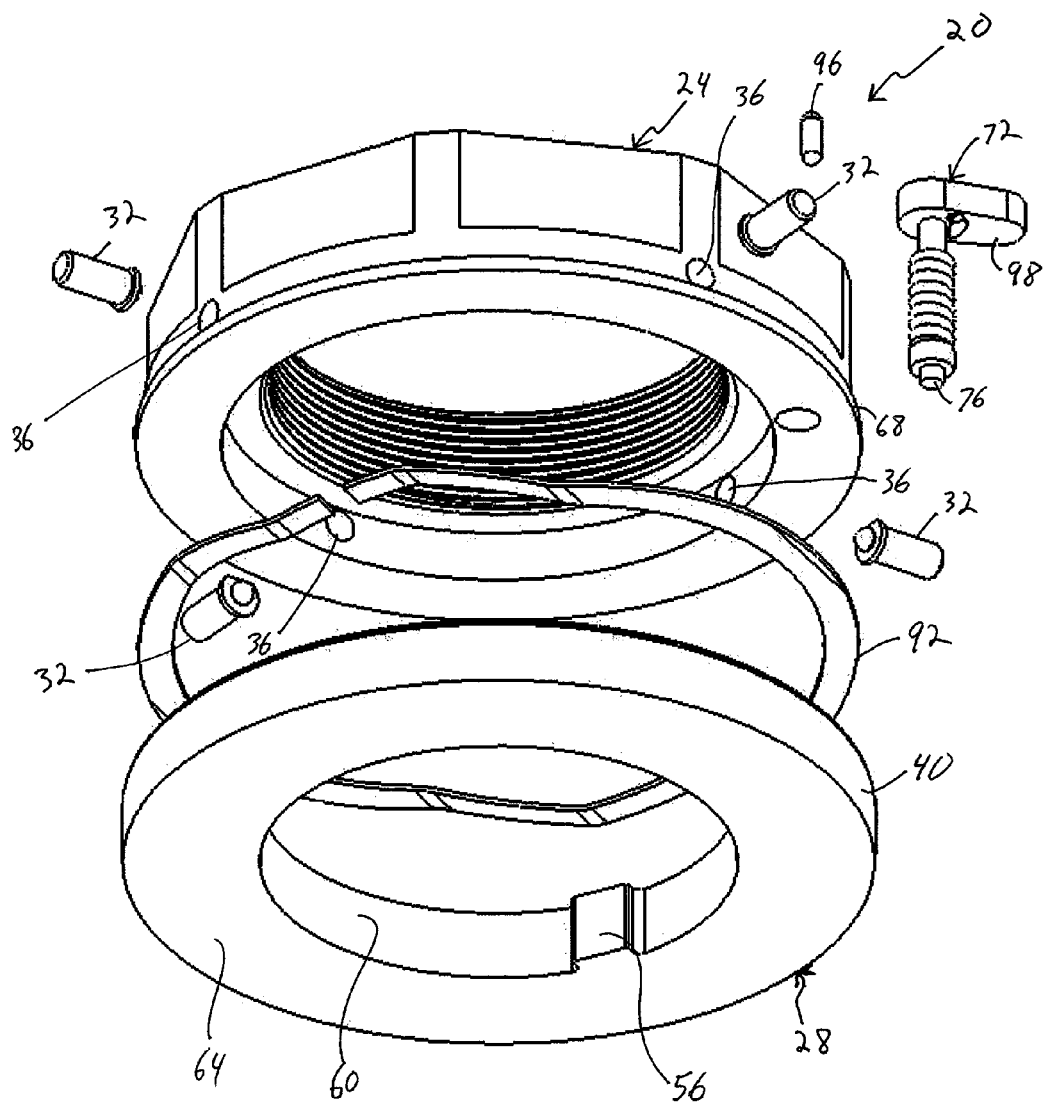
FIG. 2 is a bottom perspective of an exploded view of a self-locking nut according to an embodiment.

Embodiments of the present invention provide a variety of self-locking fasteners. Referring to the drawings, FIGS. 1-8 illustrate various views of a single piece self-locking nut assembly 20 according to an embodiment. FIGS. 1 and 2 illustrate an exploded view of a single piece self-locking nut assembly 20 according to one embodiment of the present disclosure. In the embodiment shown in FIGS. 1 and 2, self-locking nut 20 comprises a nut 24, a washer 28, and four holding features 32 that are assembled into corresponding through cavities 36 in the nut 24 to extend through to an interior portion of the nut 24. The surface of nut 24 opposite the washer 28 is referred to as the top surface of the nut 24, and the surface of the nut 24 that is adjacent to the washer 28 is referred to as the bottom surface of the nut 24. The cavities 36, in this embodiment, are through holes that extend from the outer perimeter of the nut 24 to the interior portion, although the cavities 36 do not necessarily have to extend completely through the nut 24. In this embodiment, the holding features 32 are ball plungers that have a ball element that is biased outward by a spring located within the plunger housing such that, as will be described in more detail below, the ball element engages with the washer 28 to prevent movement between the nut 24 and washer 28. In other embodiments, the holding feature 32 may comprise springs or other biased members that have a portion extending into the interior opening of the nut 24 so as to engage with the washer 28 engagement area.

The nut 24 comprises a generally octagonal outer perimeter and defines a substantially cylindrical opening through the center of the nut 24. The substantially cylindrical opening is threaded over at least a portion thereof to correspond to threads of a spindle that receives the nut assembly 20. While the nut 24 shown in FIGS. 1 and 2 has a substantially octagonal outer perimeter, nuts according to other embodiments may have other suitable shapes. For example, in one embodiment, nut may comprise a substantially hexagonal outer perimeter. In other embodiments, nut may comprise other outer perimeter shapes, including without limitation circular, square, pentagonal, or any other suitable shape.

In the embodiment illustrated in FIGS. 1-8, the nut 24 includes four cavities 36 configured to receive one holding feature 32 each. In a nut 24 having a substantially octagonal shape, four cavities 36 may be beneficial as it may provide a generally symmetric and evenly-spaced arrangement of cavities 36 around the perimeter of the nut 24. However, other configurations are contemplated and within the scope of the present invention. For example, if symmetry and even spacing are desirable, two, four, or eight cavities 36 may be employed. Additionally, the shape of the nut 24 may affect the number and arrangement of cavities 36 in a symmetrical or otherwise evenly-spaced configuration. Alternate embodiments not having evenly-spaced or symmetrically-arranged cavities 36 may comprise other numbers holding features 32. For example, a nut 24 may have one, three, or five cavities 36.

Figure 4:
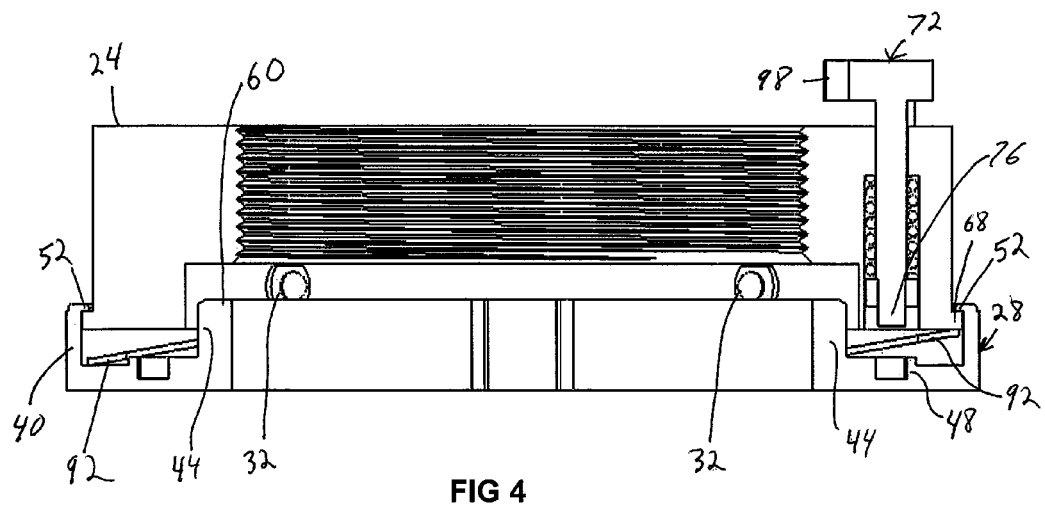
FIG. 4 is a cross-sectional view of an assembled self-locking nut assembly according to an embodiment.
Figure 6:
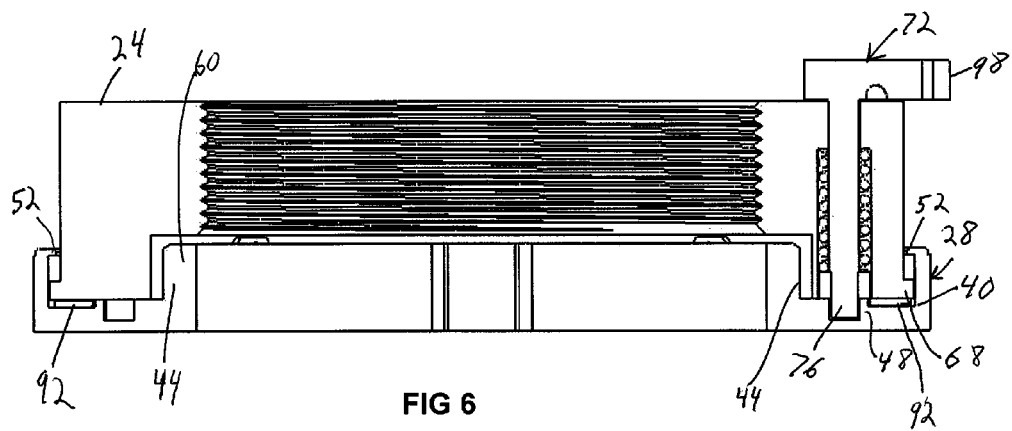
FIG. 6 is a cross-sectional view of a self-locking nut assembly as installed according to an embodiment.

The washer 28 of this embodiment comprises an outer wall 40, a washer holding feature engagement area 44, an optional washer lock pin engagement area 48, and a formed or rolled edge 52 (best viewed in FIGS. 4 and 6). In other embodiments, the holding features 32 may be arranged in cavities 36 in the nut 24 so as to extend through the bottom of the nut 24 and engage with a holding feature engagement area located on the washer base to the interior, or exterior, side of the lock pin engagement area (if present). In this embodiment, the washer 28 comprises a substantially annular shape and defines a substantially cylindrical opening through the center of the washer 28. The opening defined by washer 28 has substantially the same diameter as the opening defined by the nut 24.

In this embodiment, the washer 28 is hardened and features a wide tang area 56 which mates with a complementary spindle keyway. The wide tang 56 allows for a large area to transfer torque and acts to reduce spindle damage that may result from excessive torque being placed on the nut 24. However, in some other embodiments, the washer 28 may define other sized or shaped openings. For example, in one embodiment, washer 28 may define an opening having a square cross-section or a D-shaped cross-section. In another embodiment, washer 28 may define an opening having any suitable cross-section, such as a cross-section complementary to a cross-section of a spindle that is to receive the nut assembly 20.

In the embodiment of FIGS. 1-8, the holding features 32 are ball plungers that are secured in place by an inner wall 60 that extends up from a washer base 64. The washer 28 of the illustrated embodiment also comprises locking feature 44 located in the inside washer sidewall which is an engagement area that engages with the holding features 32 of the nut 24. In this embodiment the locking feature 44 comprises an alternating series of peaks and valleys configured to engage with holding features 32 of the nut 24. In the embodiment shown, the ridges of the locking feature 44 comprise alternating 'U' and inverted 'U' shapes. In other embodiments, the ridges may comprise a saw tooth or 'V' and inverted 'V' shape. Other suitable shapes for the locking feature 44 may be employed in other embodiments. The washer 28 in this embodiment, and best viewed in FIGS. 4 and 6, also comprises a formed or rolled lip 52 that is formed over a complementary lip 68 on the nut 24 to hold the assembly 20 together.

Figure 3:
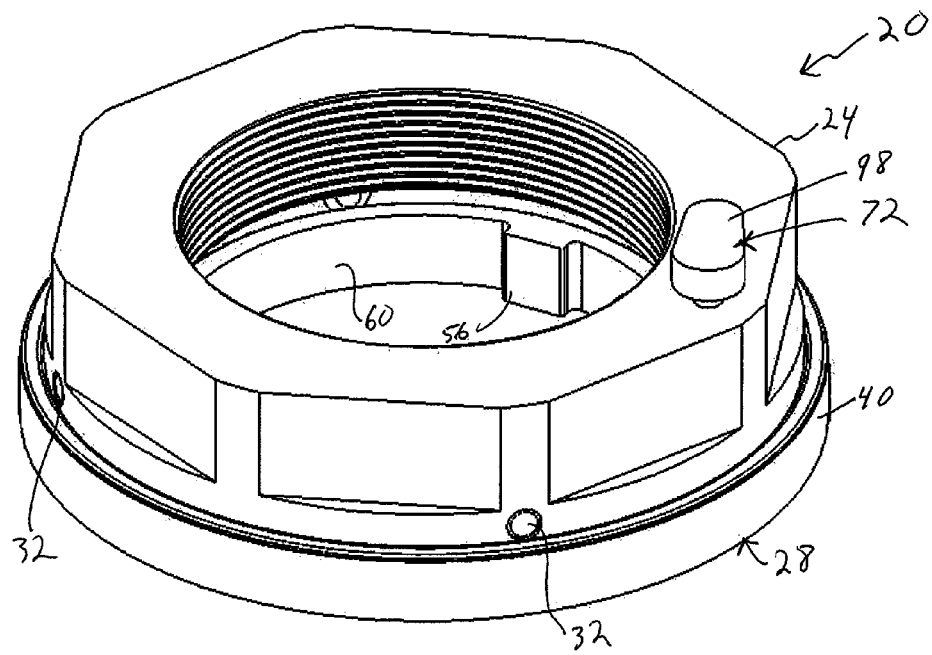
FIG. 3 is a top perspective of an assembled a self-locking nut assembly according to an embodiment.
Figure 5:
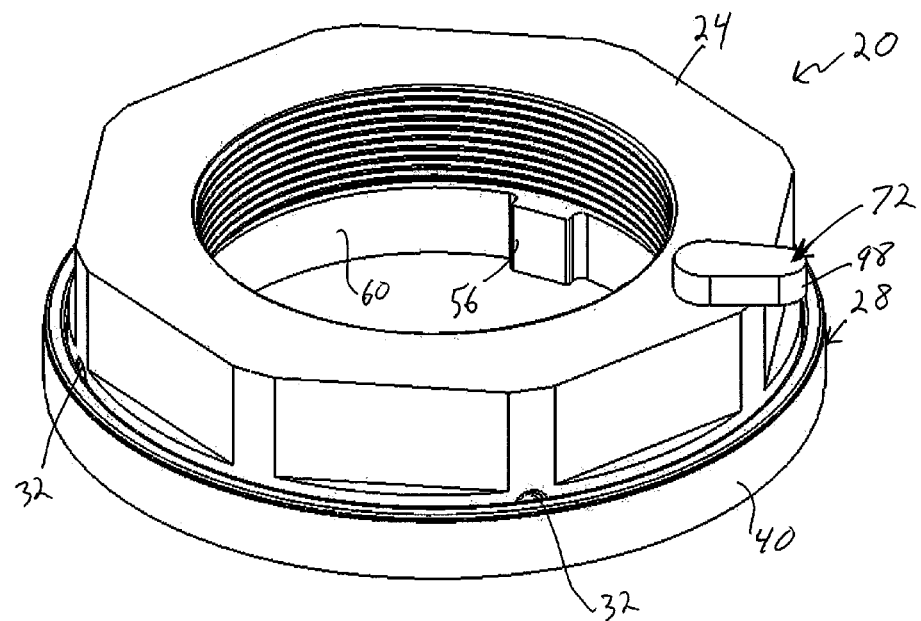
FIG. 5 is a top perspective view of a self-locking nut assembly as installed according to an embodiment.

The nut 24, in this embodiment, also includes an optional further locking feature in the form of a manually rotated spring loaded locking pin 72. In embodiments employing the manually rotated locking pin 72, the uninstalled state is illustrated in FIGS. 3 and 4, where the locking pin 72 is turned such that no portion of the locking pin 72 extends beyond the edge of the nut 24. When the nut 24 is installed, such as illustrated in FIGS. 5 and 6, the locking pin 72 may be turned to engage a lock pin 76 with the lock pin engagement area 48 in the washer. The lock pin 76 of an embodiment includes a cam type feature that engages/disengages the lock pin 76 with the washer 28 when the locking pin 72 rotated. This provides an additional locking feature beyond the holding features 32 of this embodiment. The design of the engaging holes or slots for the locking pin 72 depends on how much rotation is desired once locked, with an alternate design for such slots illustrated in the washer 80 illustrated in FIG. 9, in which lock pin engagement area 84 elongated slots 88 rather than the circular areas of engagement area 48 of the embodiment of FIGS. 1-8. A locking pin stop 96 may be used to prevent rotation of the locking pin 72 beyond certain limits, and in one embodiment the lock pin engages with an inclined groove in a bottom surface of a lever 98 causing a spring-loaded lock pin 76 to engage with the lock pin engagement area 48 on the washer.

Figure 7:
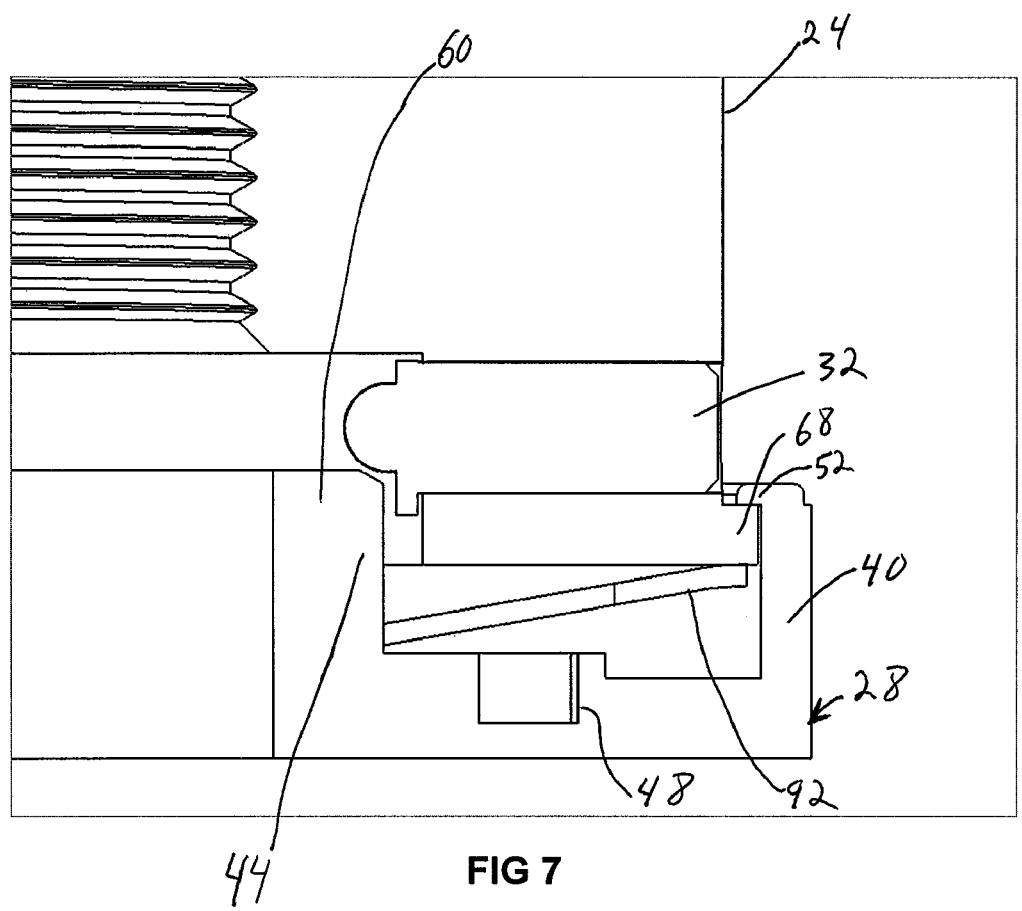
FIG. 7 is a cross-sectional view of a holding feature in a pre-installed state according to an embodiment.
Figure 8:
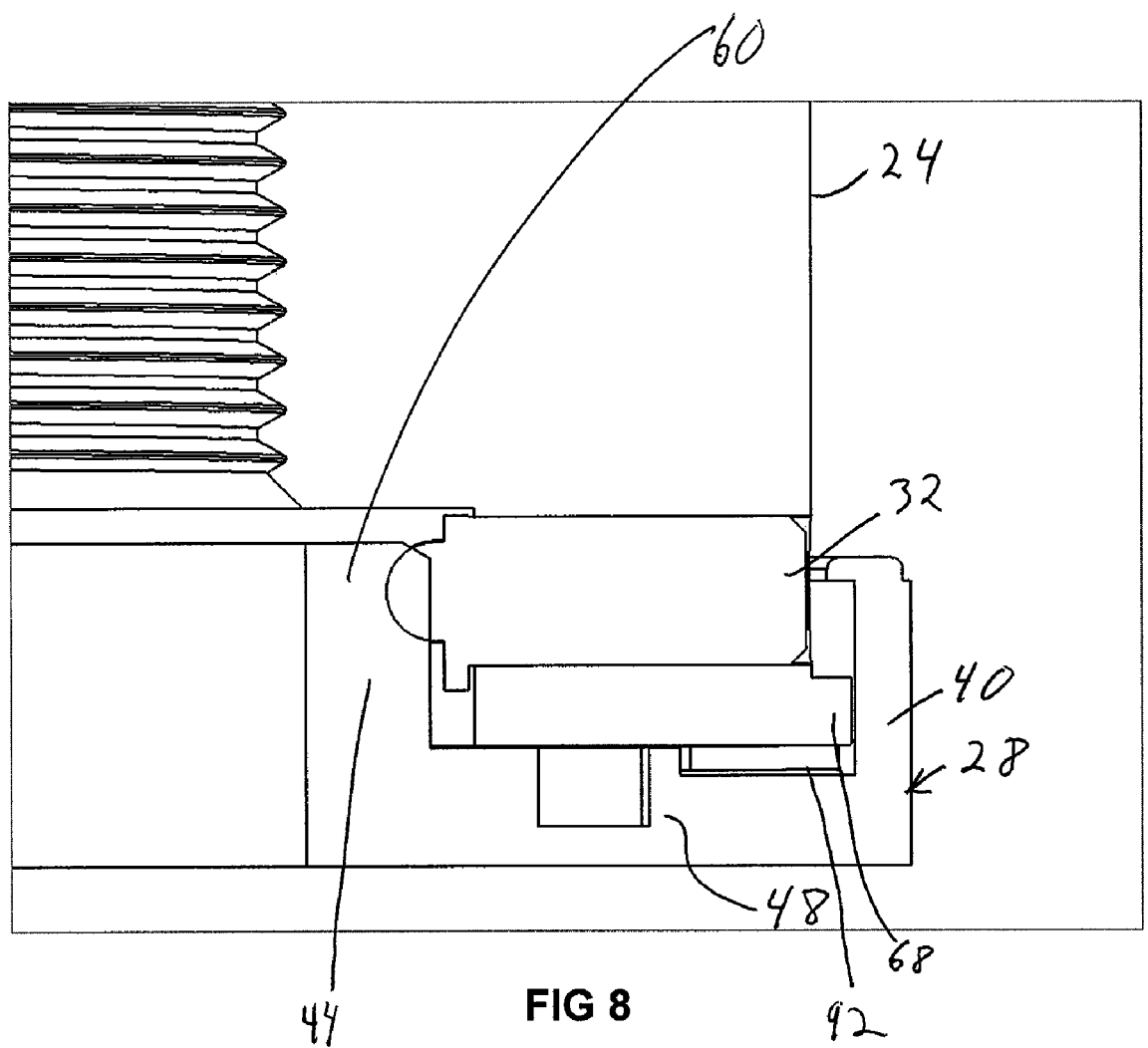
FIG. 8 is a cross-sectional view of a holding feature in an installed state according to an embodiment.
Figure 9:
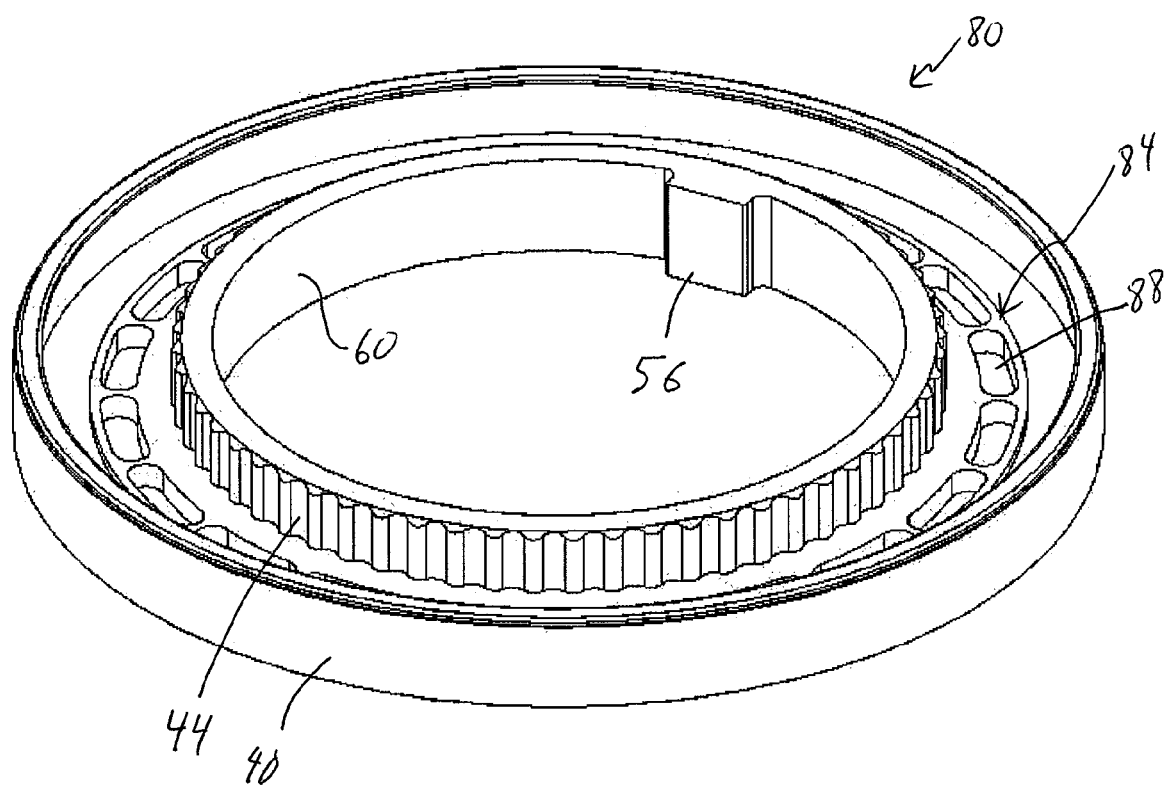
FIG. 9 is atop perspective view of a washer of another embodiment.

The self-locking nut 20 of the embodiment of FIGS. 1-8 includes a biasing member that in this embodiment is a wave spring 92 that is assembled between the washer 28 and the nut 24. The nut 24 and washer 28 are held apart by the wave spring 92 until the washer 28 contacts the bearing face, or other face to which the nut assembly 20 is being secured. At this point the wave spring 92 is compressed, engaging the nut 24 with the washer 24. As the nut 24 is tightened, the holding features 32 slide down into the grooves of the washer holding feature engagement area 44. Of course, one of skill in the art will readily recognize that other types of biasing members may be used to hold the nut 24 and washer 28 apart as described, such as a number of separate springs or resiliently deformable members. The uninstalled and installed state of the holding features 32 and washer 28 are illustrated in FIGS. 7 and 8. This allows the nut 24 to be rotated on the spindle with little resistance until the washer 28 contacts resistance when the nut 24 is almost completely tightened. In embodiments such as illustrated in FIGS. 1-8, the washer 28 includes a tang 56 that engages with a key in the spindle, and thus the nut 24 is able to rotate relative to the washer 28 until the washer 28 encounters resistance at, for example, a bearing face.

When the locking pin 72 is rotated into the unlocked position, the nut 24 and the washer 28, including the wave spring 92 form a unitary self locking nut assembly 20 suitable for use with conventional sockets. Further, the nut 24 will be free to rotate with respect to the washer 28 because the holding features 32 are not engaged with the holding feature engagement area 44 of washer 28 in an uninstalled state.

When the holding features 32 engage with the washer 28, the nut 24 is continued to be rotated causing the holding features 32, such as the illustrated ball plungers, to yield and move over a peak of one of the ridges in the engagement area 44. In some embodiments, the contact between the locking end of the holding feature 32 and the washer 28 may result in more resistance in one direction of rotation than for rotation in the opposite direction. Some embodiments may comprise additional features to increase the resistance between the holding feature 32 and the washer 28, such as through sawtooth features formed on the engagement area 44 of the washer 28. When the nut 24 is tightened to the desired torque, the holding features prevent relative movement of the nut 24 and washer 28 to prevent the nut 24 from backing off the spindle. As mentioned, some embodiments include a locking pin 72 that engages with a separate lock pin engagement area 48 on the washer base 64, and further prevents any substantial relative movement between the washer 28 and nut 24. The washer 28 in such embodiments absorbs substantially all rotational forces, while the nut 24 prevents axial movement of the assembly, and together prevent the assembly from unscrewing to maintain, for example, the bearing adjustment over time.

Although the present invention has been described with reference to particular embodiments, it should be recognized that these embodiments are merely illustrative of the principles of the present invention. Those of ordinary skill in the art will appreciate that the present invention may be constructed and implemented in other ways and embodiments. Accordingly, the description herein should not be read as limiting the present invention, as other embodiments also fall within the scope of the present invention.

What is claimed is:

1. A single piece locking nut assembly, comprising:
a nut having (i) a top surface, (ii) a bottom surface, (iii) a substantially cylindrical nut opening through the center thereof, at least a portion of which having threads that are adapted to engage with corresponding threads of a spindle, and (iv) one or more cavities that each receive a holding element that extends into said cylindrical nut opening;
a washer comprising (i) a substantially cylindrical washer opening through the center thereof, (ii) a washer base, (iii) an inner wall extending up from said washer base extending around at least a portion of said cylindrical washer opening and extending into said cylindrical nut opening, and (iv) a locking feature located on a side of said inner wall that is opposite said cylindrical washer opening, said locking feature comprising a plurality of ridges that engage said one or more holding elements; and
a biasing member located between said nut bottom surface and said washer base that prevents said one or more holding elements from engaging said locking feature when said nut assembly is not fully engaged with a spindle.

2. The single piece locking nut assembly, as claimed in claim 1, wherein when said nut assembly is threaded onto a spindle said washer base contacts a surface, and continued rotation of said nut overcomes the force of said biasing member to engage said one or more holding elements with said locking feature and prevent relative movement between said washer and said nut.

3. The single piece locking nut assembly, as claimed in claim 2, wherein said one or more holding elements comprise a resiliently biased projecting member that projects into said locking feature.

4. The single piece locking nut assembly, as claimed in claim 1, wherein said nut further comprises an outwardly extending lip located adjacent to said bottom surface, and said washer has an outer wall extending up from said washer base and extending around at least a portion of the perimeter of said washer base, said outer wall having an edge at the top thereof that extends over said outwardly extending lip.

5. The single piece locking nut assembly, as claimed in claim 1, wherein said one or more holding elements comprise ball plungers that are inserted into said one or more cavities.

6. The single piece locking nut assembly, as claimed in claim 1, wherein said locking feature comprises a series of U shaped channels.

7. The single piece locking nut assembly, as claimed in claim 1, wherein said locking feature comprises a sawtooth shaped structure.

8. The single piece locking nut assembly, as claimed in claim 1, wherein said nut further comprises a locking pin that extends from said top surface through said bottom surface, and said washer further comprises a washer lock pin feature located on said washer base that engages said locking pin to prevent substantial relative movement between said washer and said nut.

9. The single piece locking nut assembly, as claimed in claim 1, wherein said nut includes a plurality of cavities and a plurality of holding features.

10. The single piece locking nut assembly, as claimed in claim 1, wherein the number of cavities and holding features is selected based on the retention force required for the nut assembly.

11. The single piece locking nut assembly, as claimed in claim 1, wherein said washer further comprises tang area extending into said washer cylindrical opening that is adapted to engage with a keyway in an axle spindle.

* * * * *